(12) United States Patent
Farlotti et al.

(10) Patent No.: US 11,378,323 B2
(45) Date of Patent: Jul. 5, 2022

(54) LOCKER SYSTEM FOR DELIVERY OF HEAT SENSITIVE PRODUCTS

(71) Applicant: QUADIENT TECHNOLOGIES FRANCE, Bagneux (FR)

(72) Inventors: Laurent Farlotti, Arcueil (FR); Noel Le Gall, Fontenay-sous-Bois (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 320 days.

(21) Appl. No.: 16/598,821

(22) Filed: Oct. 10, 2019

(65) Prior Publication Data

US 2020/0158414 A1    May 21, 2020

(30) Foreign Application Priority Data

Nov. 16, 2018   (EP) ..................... 18306508

(51) Int. Cl.
| | |
|---|---|
| *F25D 3/12* | (2006.01) |
| *A47G 29/124* | (2006.01) |
| *A47G 29/14* | (2006.01) |
| *E05B 65/00* | (2006.01) |
| *F25D 29/00* | (2006.01) |

(Continued)

(52) U.S. Cl.
CPC .......... *F25D 3/122* (2013.01); *A47G 29/124* (2013.01); *A47G 29/141* (2013.01); *E05B 65/0042* (2013.01); *F25D 29/001* (2013.01); *G07F 9/105* (2013.01); *G07F 17/13* (2020.05); *A47G 2029/145* (2013.01); *A47G 2029/147* (2013.01); *F25D 2700/06* (2013.01)

(58) Field of Classification Search
CPC .... F25D 3/122; F25D 29/001; F25D 2700/06; A47G 29/124; A47G 29/141; A47G 2029/145; A47G 2029/147; E05B 65/0042; G07F 9/105; G07F 17/13
USPC .......................................................... 62/602
See application file for complete search history.

(56) References Cited

U.S. PATENT DOCUMENTS

| | | | |
|---|---|---|---|
| 2,840,995 | A | 7/1958 | Hazard |
| 2002/0035515 | A1 | 3/2002 | Moreno |
| 2004/0073449 | A1 | 4/2004 | Yang |

(Continued)

FOREIGN PATENT DOCUMENTS

| | | |
|---|---|---|
| CN | 108765771 A | 11/2018 |
| DE | 102006046931 A1 | 4/2008 |

(Continued)

OTHER PUBLICATIONS

European Search Report dated Apr. 9, 2019, for European Application No. 18306508 in 2 pages.

*Primary Examiner* — Steve S Tanenbaum
(74) *Attorney, Agent, or Firm* — Cozen O'Connor (57) ABSTRACT

A locker system for delivering heat sensitive products comprising a plurality of lockable compartments including at least one refrigerated lockable compartment, a control unit for controlling said plurality of lockable compartments, a cooling device comprising an expansion chamber receiving liquid $CO_2$ from a reserve of liquid $CO_2$ and delivering gaseous $CO_2$ in each of said refrigerated lockable compartments through at least one common duct, and an extraction system to avoid excessive concentration of $CO_2$ in a building where the locker system is located.

16 Claims, 5 Drawing Sheets

(51) Int. Cl.
    *G07F 9/10*     (2006.01)
    *G07F 17/12*     (2006.01)

(56) References Cited

U.S. PATENT DOCUMENTS

2016/0300187 A1* 10/2016 Kashi ................ G06Q 10/0832
2018/0242768 A1    8/2018 Lewis

FOREIGN PATENT DOCUMENTS

| | | | | |
|---|---|---|---|---|
| EP | 0631096 A1 | | 12/1994 | |
| EP | 0745816 A1 | | 12/1996 | |
| EP | 2891433 A1 | | 7/2015 | |
| EP | 3290833 A1 | * | 3/2018 | ............. F25D 3/125 |
| EP | 3290833 A1 | | 3/2018 | |
| WO | 2013004946 A1 | | 1/2013 | |

* cited by examiner

LOCKER SYSTEM FOR DELIVERY OF HEAT SENSITIVE PRODUCTS

FIELD OF THE INVENTION

The present invention relates to a locker system comprising several lockable compartments, for delivery of heat sensitive products. More specifically heat sensitive products such as fresh food are deposited by a delivery agent into one of the lockable compartments, stored for a period of time at a suitable temperature, and picked-up by customers at their earliest convenience.

Electronic parcel locker systems are used for dropping-off, storing and picking up various kinds of shipments such as parcels or packages. Such systems are typically used by carrier agents for dropping shipments, and by recipients to pick them up at convenient time, avoiding the cost and delay of failed deliveries (e.g., when the recipient is not at home). The parcel lockers may be located in residential buildings, office buildings or public places such as train stations or shopping malls.

Electronic parcel lockers comprise a user interface, typically a touchscreen, allowing the users to enter information for operating the parcel locker and opening the lockable compartment to either deposit of pick-up the shipments. The user interface is also used to capture information attached to the shipment or to some user identification means. This function can be fulfilled by reading printed barcode symbols or other technologies such as RFID transponders or near field communications. Electronic parcel locker systems generally comprise a network of parcel lockers, all communicating with a remote central system. The communication between the parcel lockers and the remote central system is performed by long distance communication technologies such as GSM, UMTS/3G or 4G. The central system is also in charge of generating electronic messages for the recipients, including unique code combinations allowing them to open the lockable compartment containing their shipments.

Electronic parcel lockers are increasingly used for other purposes, like delivery or temporary storage of purchased goods in shopping centers. The goods may be purchased in the shopping center itself or online, and will be prepared and deposited in a lockable compartment of the parcel locker. Opening codes are then sent to the customers via email or SMS like above. Perishable goods, for instance fresh food or flowers, may be delivered in that manner with the additional requirement that these goods must be stored at a suitable temperature for a period of time which may vary from a few minutes to a few hours. Fresh food may also be delivered to customers for their lunch break or dinner, in a variety of places close to their office or home.

RELATED ART

Electronic parcel lockers systems are well known. For instance EP2891433 describes an improved secure locker method and system which ensures in particular that the shipment deposited inside the locker is the right one. The system includes at least one electronic locker unit connected to a managing distribution centre through a communication network, and having several lockable compartments of different sizes. An identification code of the shipment is entered at the electronic locker unit: and specific information associated with the shipment is retrieved. The method comprises opening a compartment of the electronic locker unit, depositing the shipment inside the compartment; weighing the shipment and comparing the measured weight with the weight included within the specific information.

US20180242768 discloses a storage unit and a secure delivery system. The storage unit includes a plurality of compartments including at least one refrigerated compartment wherein each refrigerated compartment is associated with a thermostat and a cooling device, a communications module for coupling to a communications network, at least one lid for accessing the compartments, and a lock adapted to secure each lid in a closed position. The storage unit further includes a control panel for controlling the lock, wherein the control panel has a user interface for receiving input from a user, and a power source for supplying power to the cooling device and the control panel. The control panel is adapted to release the lock upon validating the received input against a code received by the communications module.

The system described above makes use of a cooling device, such as a compression motor, for refrigerating the at least one compartment. Such cooling device is not adapted for maintaining different temperatures ranges, or for rapid cooling of a compartment after the goods have been deposited. The delivery agent is thus only able to deliver the goods to the predetermined refrigerated compartments which are cooled to a predetermined temperature range.

The use of carbon dioxide or $CO_2$ is known for generating and maintaining low temperatures in warehouses, cabinets, trolleys and any kind of containers. This is due to the fact that a mix of solid and gaseous $CO_2$ is stable at atmospheric pressure and $-78.5°$ C.

EP0631096 describes an insulated enclosure for conservation and transport of fresh food, comprising a carbon dioxide snow container provided with a lateral opening allowing pressurised liquid $CO_2$ to be injected into the container by means of a distributor connected to a liquid $CO_2$ source, the distributor means being fitted with a solenoid valve controlled by a control unit comprising timer means allowing the duration of injection of liquid $CO_2$ into the container to be selected in order to form therein a metered reserve of carbon dioxide snow.

EP0745816 describe an installation for maintaining a low temperature for food storage, includes a fixed source of liquid carbon dioxide under pressure and a generator of dry ice connected to the source by a pipe. The dry ice generator includes a loading chamber into which a tray can be inserted so that the dry ice is collected on the tray. The tray containing the dry ice is then transferred to a cabinet in which a number of individual meal portions may be stacked, with the dry ice tray occupying the uppermost slot in the cabinet.

The systems described above make use of carbon dioxide snow or dry ice, allowing for rapid cooling of an insulated compartment. However these do not provide for greater flexibility than the system of US20180242768, as only a single temperature range can be achieved. There is therefore a need for a locker system comprising several lockable compartments, where heat sensitive products such as fresh food can be deposited by a delivery agent, stored for a period of time at a suitable temperature, and picked-up by customers at their earliest convenience.

OBJECTION OF THE INVENTION

It is an object of the invention to provide a locker system, where heat sensitive products such as fresh food can be deposited by a delivery agent, stored for a period of time at a suitable temperature, and picked-up by customers at their earliest convenience.

The locker system comprises several lockable compartments, the internal temperature of each being controlled to remain within a desired temperature range, which may be different according to the products to be stored therein.

It is another object of the invention to set the controlled temperature range according to an information captured from a label or tag identifier attached to the products, or retrieved in a database after the products have been identified via the label or tag identifier.

It is another object of the invention to provide for rapid cooling of a lockable compartment to a desired temperature range after the products have been deposited.

It is another object of the invention to provide a method for operating said locker system.

SUMMARY OF THE INVENTION

These objects are achieved by a locker system for delivering heat sensitive products comprising: a plurality of lockable compartments including at least one refrigerated lockable compartment, a control unit for controlling said plurality of lockable compartments, a cooling device comprising an expansion chamber receiving liquid $CO_2$ from a reserve of liquid $CO_2$ and delivering gaseous $CO_2$ in each of said refrigerated lockable compartments through at least one common duct, and an extraction system to avoid excessive concentration of $CO_2$ in a building where the locker system is located.

It is a specific aspect of the invention that the control unit is configured to control an internal temperature of said at least one refrigerated lockable compartment in order to maintain heat sensitive products deposited by a delivery agent and stored in said at least one refrigerated lockable compartment within a desired temperature range, and that each refrigerated lockable compartment comprises an electro-valve and a temperature sensor and the control unit is configured to control the electro-valve for delivering gaseous $CO_2$ from the at least one common duct in order to cool the refrigerated lockable compartment.

Preferably, the locker device further comprises a user interface for entering by the delivery agent the desired temperature range for storage of a heat sensitive product, a scanner for reading the desired temperature range for storage of a determined heat sensitive product from a label or tag identifier attached to the heat sensitive product, and a database for retrieving the desired temperature range after the determined heat sensitive product have been identified via the label or tag identifier. The database is located in the locker system itself, or in a remote delivery system connected to one or more locker systems.

It is another aspect of the invention that the control unit is configured to control the cooling device to provide for rapid cooling to a desired temperature range after a heat sensitive product has been deposited in a refrigerated lockable compartment, while the internal temperature of the refrigerated lockable compartment was not controlled before the heat sensitive product was introduced.

Preferably, the expansion chamber is divided in first and second sections by a grid, liquid $CO_2$ being injected in the first section, the second section comprising a combination of valves and an optional pressure sensor, the openings in the grid being small enough to block solid $CO_2$ particles, but large enough to let gaseous $CO_2$ flow through.

Advantageously, the expansion chamber, the common duct and the refrigerated lockable compartments are insulated from ambient temperature. The supply pipes from the reserve of liquid $CO_2$ to the expansion chamber, and then to the common duct and to the refrigerated lockable compartments may also be insulated.

Preferably, the locker system can be connected to an extraction system to avoid excessive concentration of $CO_2$ in a building where the locker system is located. Indeed, gaseous $CO_2$ will be released from the system as will be described hereafter. This extraction system may be a conventional air extraction system of the building, or be part of the locker system. In a particular embodiment, the locker device further comprises a plenum for collecting gaseous $CO_2$ through check valves from the common duct, the lockable compartments or the expansion chamber. In this case, the plenum itself is connected to the extraction system. Advantageously, the reserve of liquid $CO_2$ is enclosed inside the plenum. The extraction system may also be connected directly to the common duct, the refrigerated lockable compartments or the expansion chamber by appropriate piping.

Advantageously, the locker device further comprises an ambient temperature sensor for adjusting the quantity of liquid $CO_2$ to be injected in the expansion chamber and a weighing scale for measuring a quantity of liquid $CO_2$ remaining in the reserve.

It is another aspect of the invention to provide a method for operating the locker system for delivering heat sensitive products, the method comprising:

a) scanning by a delivery agent a label or tag identifier attached to a heat sensitive product to be deposited in the locker system or entering an identification of the heat sensitive product at a user interface of the locker system.

b) retrieving by the control unit information about the heat sensitive product, either from the scanned label or tag identifier of from a database, the information including a desired temperature range within which the heat sensitive product must be stored.

c) determining by the control unit a refrigerated lockable compartment in which the heat sensitive product can be deposited, based on the availability of a suitable refrigerated lockable compartment as well as their internal temperature.

d) unlocking the refrigerated lockable compartment for the delivery agent to deposit the heat sensitive product.

e) closing by the delivery agent and locking the refrigerated lockable compartment, and generating a message intended to the customer, the message including a unique code combination allowing the customer to open the refrigerated lockable compartment.

f) maintaining the temperature inside the refrigerated lockable compartment within the desired temperature range until the customer comes to pick-up the heat sensitive product.

g) Entering by the customer the unique code combination at the user interface and unlocking the lockable compartment for the customer to pick-up the heat sensitive product.

BRIEF DESCRIPTION OF THE DRAWINGS

The invention will be described and explained with additional specificity and detail through the use of the accompanying drawings in which.

DETAILED DESCRIPTION OF EXEMPLARY EMBODIMENTS

Figure 1:
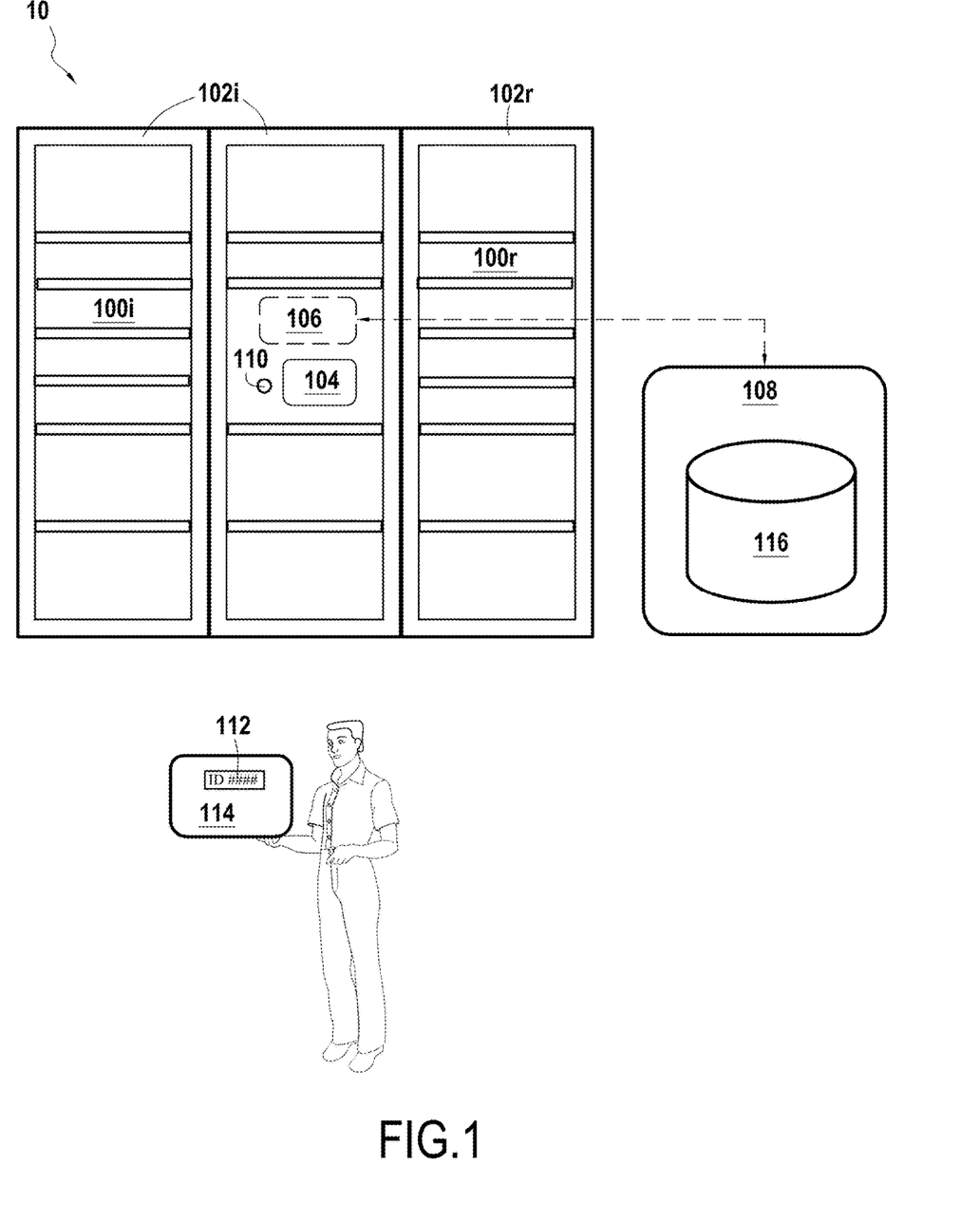
FIG. 1 is a general view of the locker system as can be seen and operated by the users.

FIG. 1 is a general view of the locker system as can be seen and operated by the users.

The locker system of the invention is very similar to a conventional electronic parcel locker, except the fact that some of the lockable compartments can be refrigerated. The locker system 10 typically comprises several lockable compartments 100i, 100r, arranged in one or more columns 102i, 102r, a user interface 104 and a control unit 106 (not visible by users). The control unit may be connected to a remote delivery system 108, itself communicating with the various parties involved in the delivery of products: merchants or senders, carriers, carrier agents and recipients. The operation of electronic parcel lockers is well known and doesn't need to be described further.

Figure 2:
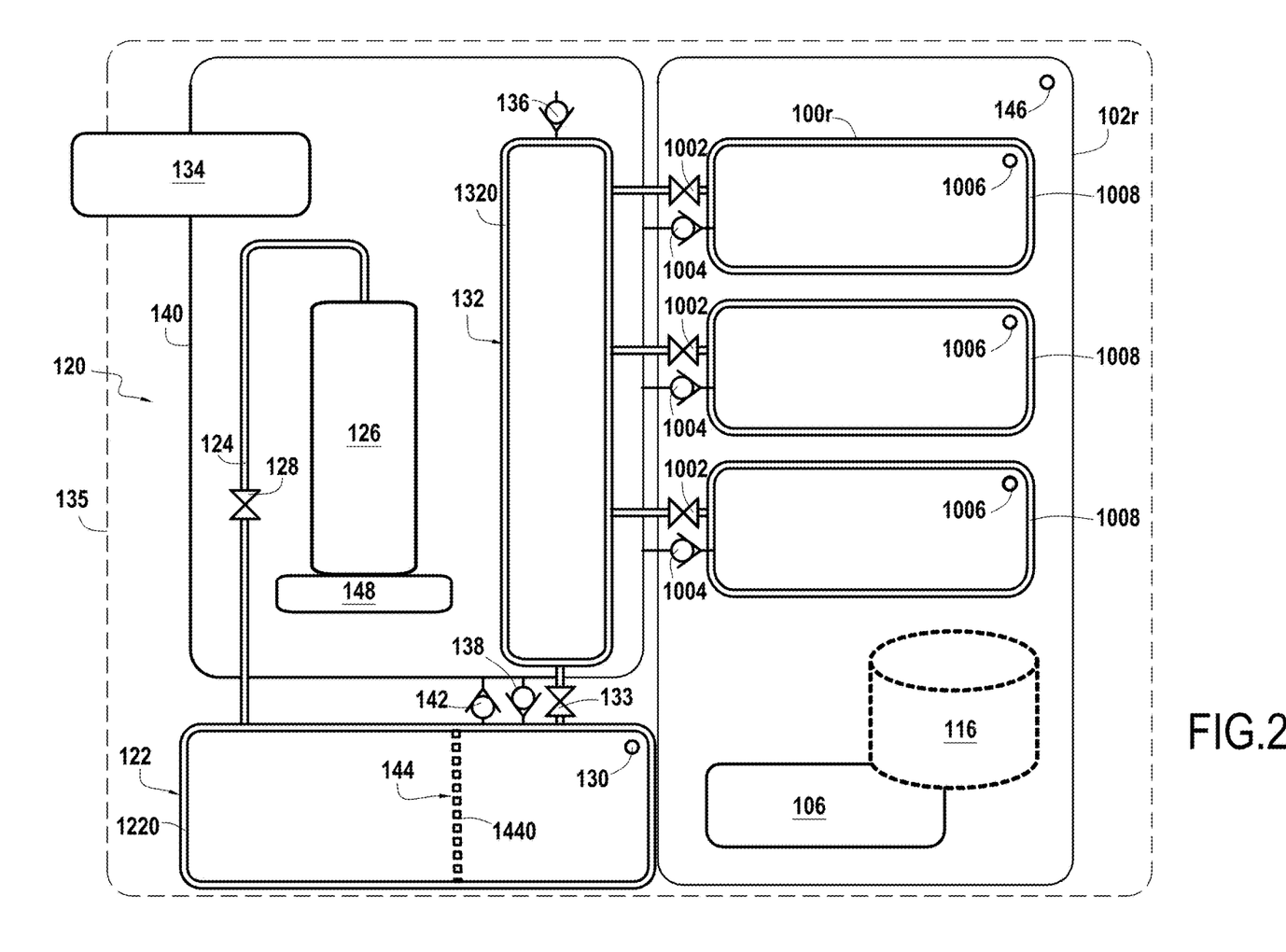
FIG. 2 is a schematic view of the cooling device according to the invention.

Like in EP2891433, the locker system typically includes a barcode scanner or RFID reader 110 to capture information from a label or tag identifier 112 attached to a product 114 carried by a delivery agent. The information may also be retrieved in a database 116 after the product has been identified via the label or tag identifier. The database may be located in the remote delivery system 108 connected to one or more locker systems of the invention or in the locker system itself as illustrated in FIG. 2. The remote delivery system 108 may also be connected to conventional, non-refrigerated, parcel lockers.

According to the present invention, the locker system comprises a cooling device 120 for refrigerating the refrigerated compartments and the information further includes a desired temperature range within which the product must be stored until the recipient will pick it up. The locker system may comprise only one column 102r of refrigerated compartments, the other columns 102i intended for the delivery of goods which can be stored at ambient temperature. Alternatively, all compartments can be refrigerated, but only the ones storing heat sensitive products will be. Indeed, there is no need to cool empty compartments, though it might be desirable to maintain a relatively low temperature in empty compartments adjacent to the ones which must be refrigerated, in order to limit heat transfers. Like in the prior art, the lockable compartment may be of different dimensions, according to the variety of products.

FIG. 2 is a schematic view of the cooling device according to the invention.

The cooling device or cooler 120 comprises an expansion chamber 122, in which $CO_2$ is injected through a supply pipe 124 from a reserve of pressurized liquid $CO_2$ 126. Liquid $CO_2$ can be supplied in bottles from various manufacturers and stored at ambient temperature. Liquid $CO_2$ is injected at regular intervals by opening an electro-valve 128 located between the reserve and the expansion chamber and controlled by the control unit 106. The pressure drop during injection causes a temperature drop and the formation of a mix of solid and gas. The expansion chamber is covered with insulating materials 1220 to limit heat transfers from ambient environment.

The pressure in the expansion chamber is maintained between atmospheric pressure and an upper limit pressure, in order to maintain the internal temperature of the expansion chamber within a predetermined temperature range. This is performed by a combination of check valves and/or electro-valves as will be described thereafter. A pressure sensor 130 may be placed in the expansion chamber to regulate the cooling device more precisely.

The cooling device further comprises at least one common duct 132 (in practice there is one common duct for one column 102r of refrigerated lockable compartments 100r), also insulated from ambient temperature (with insulating materials 1320), and connected both to the expansion chamber 122 and to the refrigerated lockable compartments 100r. The cool $CO_2$ gas flows from the expansion chamber 122 to the common duct(s) 132 through electro-valve(s) 133 controlled by the control unit 106. Electro-valves 1002 are also arranged to let this cool $CO_2$ gas flow from the duct to the refrigerated lockable compartments and safety valves 1004 are arranged directly between the refrigerated lockable compartment 100r and a plenum 134 in order to limit the pressure in the compartments to slightly above atmospheric pressure. The electro-valves 1002 are controlled by the control unit 106 according to signals received from temperature sensors 1006 located in each of the refrigerated lockable compartments. The refrigerated lockable compartments are insulated from ambient temperature by suitable materials 1008, which may be different from the ones used for the expansion chamber 122 and the common duct 132, as the internal temperature of the compartments is not expected to be as low. The supply pipes from the reserve of liquid $CO_2$ to the expansion chamber, and then to the common duct and to the refrigerated lockable compartments may also be insulated.

Preferably, the locker system comprises, or is connected to, an extraction system 134 to avoid excessive concentration of $CO_2$ in a building 135 where the locker system is located. Indeed, gaseous $CO_2$ will be released from the system as will be described hereafter. This extraction system 134 may be a conventional air extraction system of the building, or be part of the locker system. The extraction system 134 may be connected directly to the common duct 132, the refrigerated lockable compartments 100r, or the expansion chamber 122 by appropriate piping.

In a particular embodiment, the locker device further comprises a plenum 140 for collecting gaseous $CO_2$ through check valves 136, 1004, 138, from the common duct 132, the lockable compartments 100r or the expansion chamber 122. In this case, the plenum itself is connected to the extraction system 134. Advantageously, the reserve 126 of liquid $CO_2$ is enclosed inside the plenum, where the temperature is sensibly lower than the ambient temperature. In other embodiments, the reserve 126 may be located outside the locker device or even outside the building.

More particularly, the check valve 136 is arranged to limit the pressure inside the duct to approximately 1.5 Bar, the pressure inside the lockable compartments being limited by the check-valves 1004 to slightly above atmospheric pressure. A safety check valve 138 is arranged directly between the expansion chamber 122 and the plenum 140 in order to limit the pressure in the expansion chamber to a maximum value of for instance 2.5 Bar. A return check valve 142 is arranged between the plenum 140 and the expansion chamber 122, in order to maintain the pressure in the expansion chamber above atmospheric pressure. The plenum 140 doesn't need to be insulated from ambient temperature, but is connected to an extraction system 134 in order to avoid excessive concentration of $CO_2$ in the building where the locker system is located. Ideally the reserve of pressurized liquid $CO_2$ 126 and the supply pipe 124 are enclosed inside the plenum 140 to benefit from a sensibly lower temperature.

Alternatively, the safety check valve 138 and return check valve 142 may be replaced by one single electro-valve (not illustrated), which is controlled to regulate the pressure in the expansion chamber within a predetermined pressure range, according to the signals received from the pressure sensor 130. This pressure range is compatible with the existence of a mix of solid and gaseous $CO_2$, the upper limit pressure being smaller than 5 Bar, and the temperature in the expansion chamber being greater than −78.5° C. (atmospheric pressure) and lower than −56° C.

The safety check valve 138, return check valve 142 and the pressure sensor 130 may also be suppressed and the pressure in the expansion chamber regulated only by the electro-valve 133 and safety check valve 136 of the common duct 132. However in this case, a large quantity of gaseous $CO_2$ may be released in the plenum 140 each time the electro-valve 133 is opened, resulting in an undesirably high consumption. Furthermore, the pressure in the expansion chamber may increase to unwanted levels in case of malfunction of the electro-valve 133 and/or safety check valve 136.

When the pressure in the expansion chamber 122 is regulated by the check valve 138 and return check valve 142 (or alternatively one single electro-valve), it is also possible that no safety check valve 136 is provided on the common duct 132. In this case, the pressure in the common duct becomes the same as in the expansion chamber each time the electro-valve 133 is opened, and can be higher than the one that would be allowed by a check valve 136. This may be interesting for instance when rapid cooling of one refrigerated lockable compartment 100r is required. In the other hand, gaseous $CO_2$ can only be evacuated from the common duct 132 to the refrigerated lockable compartments 100r, whether or not one of them needs to be cooled. Each combination of valves described above has its respective advantages and disadvantages. For illustrative purposes, we assume that safety check valves 136, 1004 and 138 are provided in the following of the description.

The expansion chamber 122 is divided in two sections by a grid 144. Liquid $CO_2$ is injected in the first section. The valves (electro-valves and/or check valves) and the optional pressure sensor 130 are located in the second section. The particles of solid $CO_2$ formed during injection accumulate against the grid as ice of snow. The openings 1440 of the grid are small enough to block solid $CO_2$ particles, but large enough to let gaseous $CO_2$ flow through. The blocking of the valve is thus prevented. The valves may also be slightly heated by a resistor (not illustrated) at specific points of a cycle.

The control unit 106 controls the user interface 104, the barcode scanner or RFID reader 110, the individual locks (not illustrated) for opening of the lockable compartments 100, the various sensors 130, 1006 and the electro-valves 128, 133, 1002. An additional sensor 146 may be arranged to monitor the ambient temperature and to adjust the quantity of liquid $CO_2$ to be injected in the expansion chamber 122 accordingly. A weighing scale 148 may be used to measure the quantity of liquid $CO_2$ remaining in the reserve 126.

The control unit 106 communicates with the remote delivery system 108 like in the electronic parcel lockers of the prior art. This is particularly important to send warnings or alerts whenever the temperature of a refrigerated lockable compartment 100r has gone outside the desired range, if the quantity of liquid $CO_2$ becomes lower than a predetermined threshold, or in case of malfunction of the cooling device 120. The control unit 106 traditionally may be composed of several modules, each having its own memory and processing means (e.g., single or multicore microprocessor, microcontroller, central processing unit (CPU), digital signal processor (DSP), graphics processing unit (GPU), application specific integrated circuit (ASIC), field programmable gate array (FPGA), programmable logic controller (PLC), collectively and individual referred to as processor or processors). In a preferred embodiment, a specific electronic module is in charge of controlling the cooling device.

Figure 3:
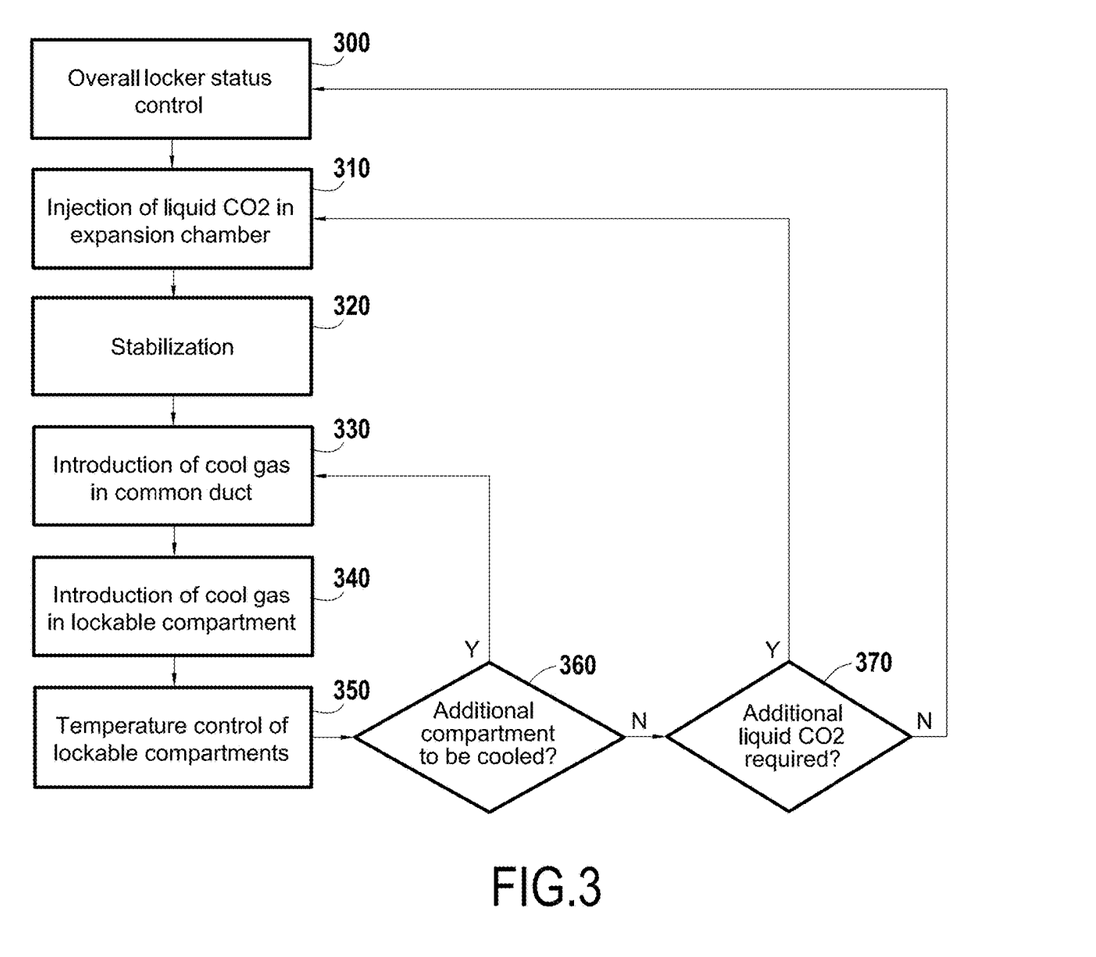
FIG. 3 shows a standard cycle for operating the cooling device.

FIG. 3 shows a standard cycle for operating the cooling device.

At step 300, the overall status of the locker system is controlled. This includes measuring the ambient (external) temperature, retrieving from the memory the actual content of the lockable compartments, the desired temperature range and the actual temperature of the lockable compartments. This information, along with historical data from preceding cycles, is used to determine a quantity of liquid $CO_2$ to be injected in the expansion chamber.

At step 310, a quantity of liquid $CO_2$ is injected in the expansion chamber. This is achieved by opening the electro-valve for a short period of time of typically 100 milliseconds. For ambient temperature ranging from 20° C. to 30° C., the pressure in the reserve is between 57 and 72 Bar. Alternatively, liquid $CO_2$ may be supplied in refrigerated bottles at −20° C. and 20 Bar. The pressure drop during injection causes a temperature drop and the formation of a mix of solid and gas. The internal pressure is maintained above atmospheric pressure by the check valve connected to the plenum. The volume of the expansion chamber is typically of 20 litres and the quantity of liquid $CO_2$ injected in the range of a few hundreds of grams.

Step 320 corresponds to a stabilisation period. Because the internal pressure is maintained above atmospheric pressure, the temperature in the expansion chamber is above −78.5° C. Heat transfers happen through the insulated walls, eventually due to the ingestion of gas from the plenum, or to the heating of the valves. Solid $CO_2$ starts sublimating, causing temperature and pressure to increase in the expansion chamber. This internal pressure can be monitored by the pressure sensor to make sure it reaches a desired level, sufficient to ensure proper filing of the common duct. Alternatively, the duration of the stabilisation period can be computed. In any case, the internal pressure is maintained within safety limits by check valve 138.

At step 330, the electro-valve between the expansion chamber and the duct is opened, causing the pressure in the duct to increase. Excess gas is evacuated in the plenum by the check valve, in order to limit the pressure in the duct to approximately 1.5 Bar. The electro-valve is closed at the end of step 330. The duration of this step can be computed according to the signals received from the pressure sensor, to ensure filling of the duct at a pressure of at least 1.5 Bar, and to limit the quantity of gas evacuated in the plenum.

At step 340, cool gas is introduced from the duct in one of the lockable compartments by opening the electro-valve. This happens because it has been determined that the temperature inside the lockable compartment is approaching the top of the desired temperature range for the products stored therein. It might also be desirable to maintain a relatively low temperature in empty compartments adjacent to the ones which must be refrigerated, in order to limit heat transfers. The volume of the duct is small with respect to the one of the lockable compartment (typically 50 to 100 times smaller) in order to limit the temperature drop to a few ° C.

Steps 330 and 340 may be repeated a number of times until a desired temperature, for instance the middle of the desired temperature range, is reached. Excess gas is evacuated in the plenum by the check valves, in order to limit the pressure inside the lockable compartments to slightly above atmospheric pressure. These check valves are also necessary to avoid safety issue in case of malfunction of the cooling device, for instance blocking of the electro-valves or check valves limiting the pressure in the expansion chamber and the common duct.

At step 350, the temperature in all compartments is controlled and it is determined in a test step 360 whether the steps 330 and 340 shall be repeated for another lockable compartment, and then in a test step 370 whether steps 300 and/or 310 shall be repeated. This might not be necessary, as the quantity of liquid $CO_2$ injected at step 310 may be sufficient for cooling several lockable compartments.

Figure 4:
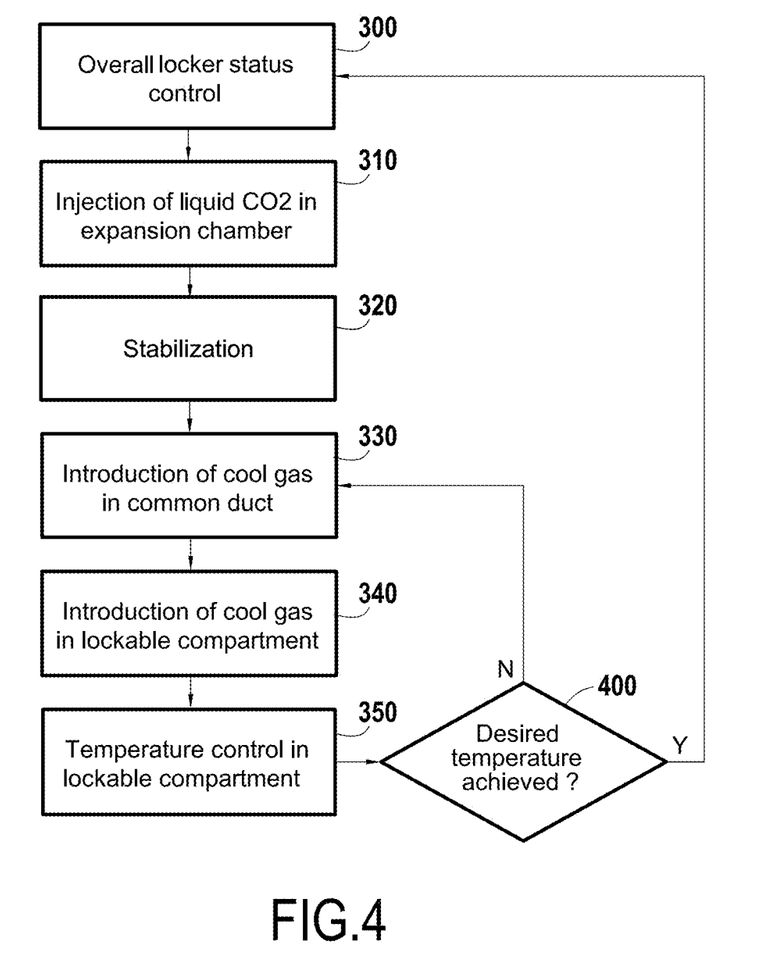
FIG. 4 shows a particular cycle for rapid cooling of a compartment.

FIG. 4 shows a particular cycle for rapid cooling of a compartment.

Rapid cooling may be required when a product is introduced in the lockable compartment which was empty before. The temperature inside the compartment may be cooler or equal to the ambient temperature, but still above the desired temperature range for the product.

The cycle illustrated in FIG. 4 is very similar to the one of FIG. 3 (the same steps carry the same references) and will not be described again. The main difference is that steps 330 to 350 are repeated a number of times (test step 400) until a desired temperature, for instance the middle of the desired temperature range, is reached.

The cycles of FIGS. 3 and 4 may be adapted to limit temperature drop in lockable compartments, but also the consumption of liquid $CO_2$. For instance, the temperature may be maintained slightly below the top of the desired temperature range during the warmest hours of the day. Similarly, the rapid cooling of FIG. 4 may be performed in several phases, in order to let the temperature of the products (which cannot be measured) stabilize. Because the products are supposedly coming from a refrigerated container and have their own thermal inertia, these may very well cool the air inside the lockable compartment. It is therefore desirable to monitor the evolution of the internal temperature before performing the rapid cooling cycle.

Figure 5:
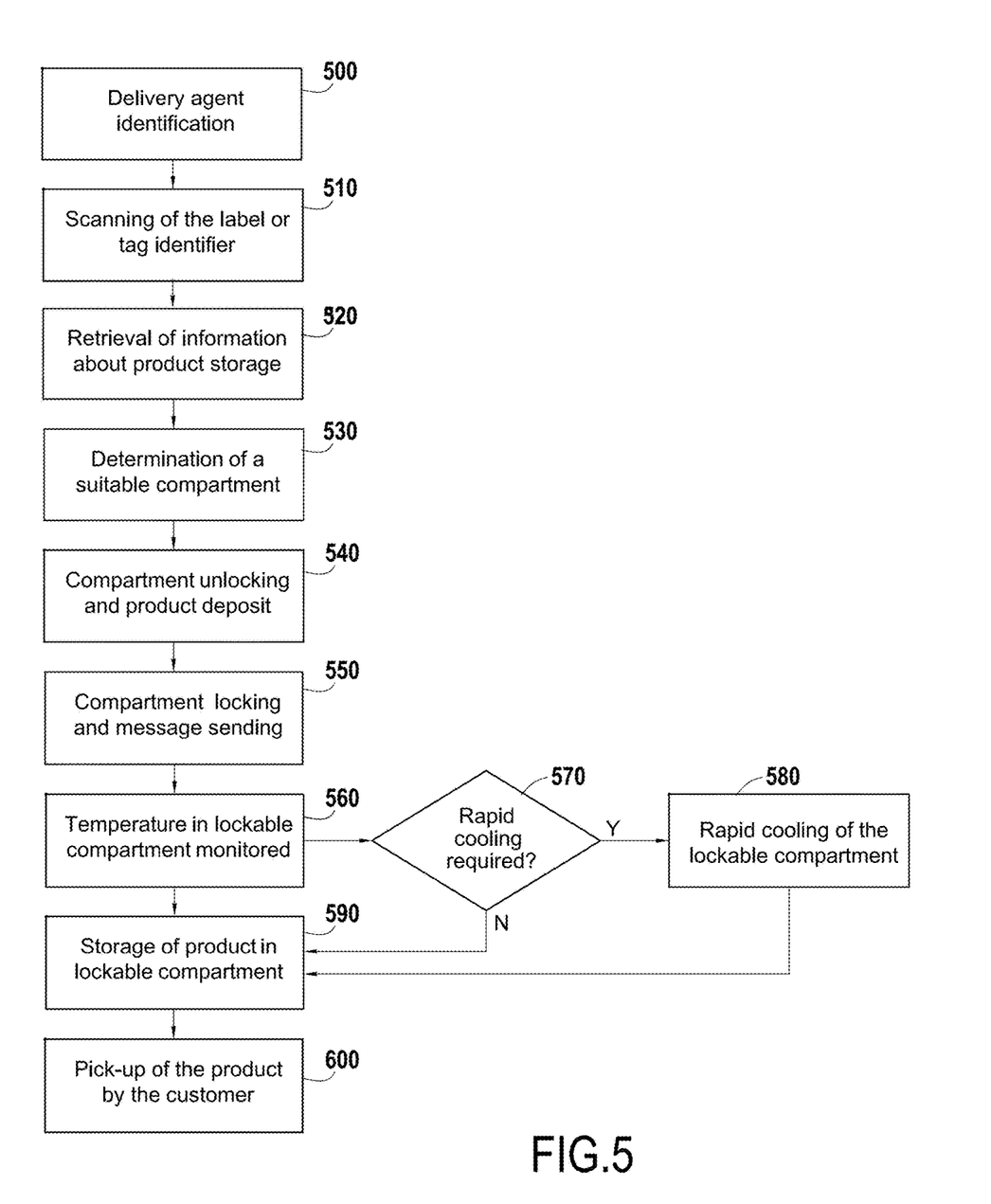
FIG. 5 is a flowchart showing the main steps of the method of the invention.

FIG. 5 is a flowchart showing the main steps of the method of the invention.

At step 500, a delivery agent identifies itself by scanning or entering or PIN code at the user interface of the locker systems.

At steps 510, the delivery agent scans the label or tag identifier attached to a product to be deposited in the locker system. Alternatively, an identification of the product may be entered at the user interface of the locker systems.

At step 520, the control unit retrieve information about the product, either from the scanned barcode or tag identifier of from the database. When applicable, the information includes the desired temperature range within which the product must be stored.

At step 530, the control unit determines a lockable compartment in which the product can be deposited. This determination is based on the availability of a suitable compartment as well as their internal temperature. Depending on product storage requirements, it might be desirable to deposit it in a precooled, or adversely in a standard, non-refrigerated, compartment.

At step 540, the lockable compartment is unlocked for the delivery agent to deposit the product.

At step 550, the compartment is closed by the delivery agent, locked again, and a message intended to the customer is generated. The message may be generated by the control unit of the storage compartment, or by the remote delivery system. Like in the prior art, the message includes a unique code combination allowing the customer to open the lockable compartment.

At step 560, the temperature inside the lockable compartment is monitored and, if required (response Yes at the test of step 570), the rapid cooling cycle of FIG. 4 is performed in a further step 580.

At step 590, the temperature inside the lockable compartment is maintained within the desired temperature range by the repetition of the cycle of FIG. 3. This step lasts until the customer comes to pick-up the product.

At step 600, the customer enters the unique code combination at the user interface. This causes the lockable compartment to be unlocked for the customer to pick-up the product.

Many variations of the method are possible. For instance a warning may be displayed to the customer if the temperature of a lockable compartment has gone outside the desired range. Indeed, food often require to be stored at low temperature: 8° C. for milk, butter or eggs, 4° C. for meat, fish, cheese or vegetables, −12° C. or −18° C. for frozen products, while flowers only need to be kept between +5° C. and +15° C. Moreover thermal shock is detrimental to flowers and must be avoided. The cooling of the lockable compartment shall be adapted accordingly.

The locker system may also be divided in several columns, each with lockable compartments maintained at different temperatures suited for various categories of food or other products. In this case, it is not necessary to retrieve the desired temperature range from the information linked to the label or tag identifier, but only a class of products and storage conditions. The desired temperature range may then be entered or selected by the delivery agent at the user interface of the locker. The locker system may also comprise several ducts, for instance one duct for each column of refrigerated lockable compartments, said duct being common to all refrigerated lockable compartments of a said column.

Though exemplary values of pressure and temperature are given for illustrative purposes, other combinations are possible. Notably the pressure and temperature in the expansion chamber may vary within respective ranges compatible with the existence of a stable mix of solid and gaseous $CO_2$.

The invention claimed is:

1. A locker system for delivering heat sensitive products, the locker system comprising: a plurality of lockable compartments including at least one refrigerated lockable compartment, a control unit for controlling said plurality of lockable compartments, a cooling device comprising an expansion chamber receiving liquid $CO_2$ from a reserve of liquid $CO_2$ and delivering gaseous $CO_2$ in each of said refrigerated lockable compartments through at least one common duct, and an extraction system to avoid concentration of $CO_2$ in a building where the locker system is located and further comprising a plenum for collecting gaseous $CO_2$ through check valves from the at least one common duct, the lockable compartments or the expansion chamber, the plenum being connected to the extraction system to avoid concentration of $CO_2$ in a building where the locker system is located.

2. The locker system of claim 1, wherein the control unit is configured to control the cooling device to provide for rapid cooling to a desired temperature range after a heat sensitive product has been deposited in a refrigerated lockable compartment, while the internal temperature of the refrigerated lockable compartment was not controlled immediately before the heat sensitive product was introduced.

3. The locker system of claim 1, wherein the expansion chamber comprises a combination of valves and optionally a pressure sensor for regulating the pressure in the expansion chamber between atmosphere pressure and an upper limit pressure, in order to maintain the internal temperature of the expansion chamber within a predetermined temperature range.

4. The locker system of claim 1, wherein the reserve of liquid $CO_2$ is enclosed inside the plenum.

5. The locker system of claim 1, further comprising an ambient temperature sensor that provides a temperature measure to the controller unit which uses the temperature measure to adjust the quantity of liquid $CO_2$ to be injected in the expansion chamber.

6. The locker system of claim 1, further comprising a weighing scale to measure a quantity of liquid $CO_2$ remaining in the reserve.

7. The locker system of claim 1, wherein the extraction system is a conventional air extraction system of the building or a part of the locker system.

8. The locker system of claim 1, wherein the expansion chamber, the at least one common duct and the refrigerated lockable compartments are insulated from ambient temperature.

9. The locker system of claim 8, wherein a number of supply pipes that provide passage from the reserve of liquid $CO_2$ to the expansion chamber, to the common duct and to the refrigerated lockable compartments are further insulated from ambient temperature.

10. The locker system of claim 1, wherein the control unit is configured to control an internal temperature of said at least one refrigerated lockable compartment in order to maintain heat sensitive products deposited by a delivery agent and stored in said at least one refrigerated lockable compartment within a desired temperature range.

11. The locker system of claim 1, wherein each refrigerated lockable compartment comprises an electro-valve and a temperature sensor and the control unit is configured to control the electro-valve for delivering gaseous $CO_2$ from the at least one common duct in order to cool the refrigerated lockable compartment.

12. The locker system of claim 10, further comprising a user interface via which the desired temperature range for storage of a heat sensitive product is enterable by the delivery agent.

13. The locker system of claim 10, further comprising a scanner operable to read the desired temperature range for storage of a determined heat sensitive product from a label or tag identifier attached to the heat sensitive product.

14. The locker system of claim 13, further comprising a database stored on a nontransitory computer-readable medium and accessible to retrieve the desired temperature range after the determined heat sensitive product have been identified via the label or tag identifier.

15. The locker system of claim 14, wherein the database is located in the locker system itself, or in a remote delivery system connected to one or more locker systems.

16. A locker system for delivering heat sensitive products, the locker system comprising: a plurality of lockable compartments including at least one refrigerated lockable compartment, a control unit for controlling said plurality of lockable compartments, a cooling device comprising an expansion chamber receiving liquid $CO_2$ from a reserve of liquid $CO_2$ and delivering gaseous $CO_2$ in each of said refrigerated lockable compartments through at least one common duct, and an extraction system to avoid concentration of $CO_2$ in a building where the locker system is located, wherein the expansion chamber comprises a combination of valves and optionally a pressure sensor for regulating the pressure in the expansion chamber between atmosphere pressure and an upper limit pressure, in order to maintain the internal temperature of the expansion chamber within a predetermined temperature range, and wherein the expansion chamber is divided in first and second sections by a grid, liquid $CO_2$ being injected in the first section, the second section comprising the plurality of valves and the optional pressure sensor, openings in the grid being small enough to block solid $CO_2$ particles, but large enough to let gaseous $CO_2$ flow through.

\* \* \* \* \*